United States Patent [19]

Kuczenski

[11] 4,413,938

[45] Nov. 8, 1983

[54] SPINDLE MOTOR POWERED DRAWBAR

[75] Inventor: Steven R. Kuczenski, New Holstein, Wis.

[73] Assignee: Kearney & Trecker Corporation, Milwaukee, Wis.

[21] Appl. No.: 332,608

[22] Filed: Dec. 21, 1981

[51] Int. Cl.³ .............................................. B23C 5/26
[52] U.S. Cl. ...................................... 409/233; 279/8; 408/239 R
[58] Field of Search ............ 409/231, 233; 279/1 TS, 279/8; 408/239 R, 239 A

[56] References Cited

U.S. PATENT DOCUMENTS

| 3,806,272 | 4/1974 | Muller | 408/239 R |
| 3,842,712 | 10/1974 | Bondie | 408/239 R X |
| 3,823,642 | 7/1974 | Jerve | 408/239 R X |
| 3,893,371 | 7/1975 | Frazier | 409/233 |
| 4,131,054 | 12/1978 | Johnson et al. | 409/233 |
| 4,199,286 | 4/1980 | Kirkham | 409/233 |

FOREIGN PATENT DOCUMENTS 742047 7/1980 U.S.S.R. .............................. 409/234

Primary Examiner—William R. Briggs
Attorney, Agent, or Firm—Quarles & Brady

[57] ABSTRACT

The spindle of a machine tool has a drawbar disposed therein for threaded engagement into and out of the toolholder inserted into the spindle bore to releaseably secure the toolholder within the spindle. Splined on the rearward end of the drawbar distal from the spindle is a spur gear which is shiftable into and out of engagement with a cluster gear driven by the spindle drive motor. When the spur gear on the rearward drawbar end is shifted into engagement with the cluster gear driven by the spindle drive motor, the drawbar will be rotatably threaded either into or out of the toolholder shank by the spindle drive motor and thus, the need for a separate motor to rotatably drive the drawbar is eliminated.

7 Claims, 1 Drawing Figure

SPINDLE MOTOR POWERED DRAWBAR

BACKGROUND OF THE INVENTION

This invention relates generally to machine tool spindles having a drawbar disposed therein for threaded engagement onto or off of a toolholder inserted in the spindle bore and, more specifically, to a machine tool spindle having a drawbar therein which is rotatably driven by the spindle drive motor.

Present day numerically controlled milling machines, such, as the Kearney & Trecker Model Data Mill 700 milling machine, for example, having a cutting toolholding spindle therein which is driven by a spindle drive motor through a suitable gearing arrangement. Extending coaxially into the bore of the spindle is a drawbar which is rotatably driven for threaded engagement into or out of the shank of a toolholder disposed in the bore of the spindle to engage and to disengage, respectively, the toolholder in the spindle. Heretofore, separate motor drive systems have been employed within the machine for rotatably driving the drawbar within the spindle and for rotatably driving the spindle itself. A motor drive system well suited for rotatably driving the drawbar to thread it into or out of the toolholder shank is described and claimed in U.S. Pat. No. 4,199,286 issued to Edward E. Kirkham and assigned to the assignee of the present invention.

Employing separate drive systems for rotatably driving the drawbar within the spindle and for rotatably driving the spindle itself necessitates separate motors which not only increases machine tool cost, but also increases machine tool complexity since separate controls for each motor are required. Such increased machine tool complexity invariably leads to greater repair expenses should service ever become necessary.

It is thus an object of the present invention to provide a machine tool spindle in which the drawbar and spindle are rotatably driven from a single source of rotational energy.

It is another object of the present invention to provide a machine tool spindle having a drawbar therein rotatably driven by the machine tool spindle drive motor.

BRIEF SUMMARY OF THE INVENTION

Briefly, in accordance with the preferred embodiment of the invention, apparatus for rotatably driving the drawbar within the spindle of a machine tool, from the same source of rotational energy (the spindle drive motor) which drives the spindle through the spindle gear train, comprises a spur gear which is carried on that portion of the drawbar extending rearwardly from the spindle. The spur gear, which is dimensioned to engage a complementary gear within the spindle gear train, is normally biased out of engagement with the spindle gear train by a spring which is seated in a bore in the rearward end of the spindle. Shifter means, typically comprised of a shifter fork in engagement with the spur gear, and a hydraulically actuated cylinder fastened to the machine tool with its shaft secured to the shifter fork, are provided for shifting the spur gear against the spring and into engagement with the spindle gear train. Once the spur gear is shifted into engagement with the spindle gear train and the spindle is locked against rotational movement, the drawbar can be threaded into or out of the toolholder by appropriately energizing the spindle drive motor, thus eliminating the need for a separate drawbar driver motor.

BRIEF DESCRIPTION OF THE DRAWING

The features of the invention believed to be novel are set forth with particularity in the appended claims. The invention, itself, however, both as to organization and method of operation, together with further objects and advantages thereof, may best be understood by reference to the following description taken in conjunction with the accompanying drawings in which:

DETAILED DESCRIPTION OF THE PREFERRED EMBODIMENT

Figure 1:
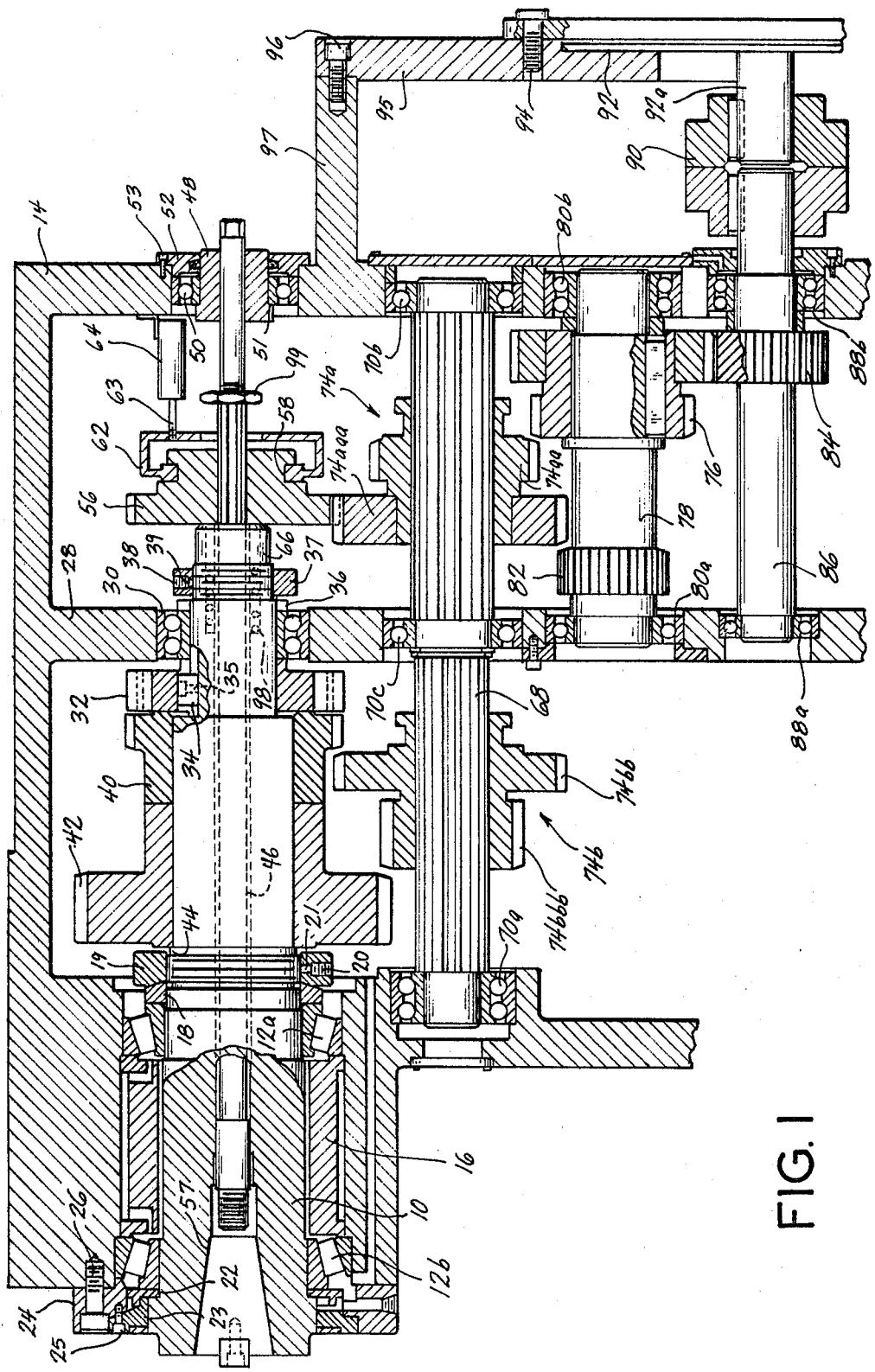
FIG. 1 illustrates a cross-sectional view of a portion of a machine tool whose spindle has a drawbar which is rotatably driven by the spindle drive motor in accordance with the teachings of the present invention.

FIG. 1 illustrates a cross-sectional view of a portion of a machine tool having a hollow bore, tool-receiving spindle 10 which is rotatably journaled by a pair of tapered roller bearings 12a and 12b into the lefthand end of a frame (spindle-head) 14 which is slidably mounted on the machine tool column (not shown) for movement thereon. Bearings 12a and 12b are separated on the spindle by a bushing 16 which has a projection extending from opposite ends thereof so as to be in abutment with the outer race of each of the bearings. The bearings are loaded by a spacer 18 which is urged against the righthand edge of the inner race of bearing 12a by a nut 19 in threaded engagement about the spindle adjacent to spacer 18. Nut 19 is prevented from loosening by three set screws 20 (only one of which is shown), the set screws being radially threaded through the nut so as to force brass shoes 21 into engagement with the spindle. Roller bearing 12b is carried on spindle 10 between the left end of bushing 16 and an oil labyrinth 22 which is urged against roller bearing 12b by the spindle oil shield 23. Spindle oil shield 23 is seated in a circumferentially extending groove in the bore of a bearing cap 24 and is secured to bearing cap 24 by screws 25. Bolts 26 (only one of which is shown) secure bearing cap 24 to the left end of frame 14 so that the bearing cap overlies roller bearing 12b. The bore through bearing cap 24 is dimensioned to permit spindle 10 to extend therethrough.

The right or rearward end of spindle 10 is journaled into a vertically extending wall 28 in frame 14 by a ball bearing 30 carried by the spindle. Carried on the spindle to the left of ball bearing 30 is a keylock disk 32 having a plurality of passages disposed axially therethrough. The keylock disk has a keyway (not shown) axially inscribed in the bore therethrough which engages a complementary key 34 secured to spindle 10 by a screw 35. The keylock disk operates in conjunction with a plunger (not shown) to lock the spindle against rotation when the plunger is urged into engagement with one of the keylock disk passages. A spacer 36, of a diameter slightly larger than the inner race of bearing 30, is urged against the lower bearing race by a collar 37 in threaded engagement with the rear end of the spindle so that the leftward side of the inner bearing race abuts the shoulder on keylock disk 32. Three set screws 38 (only one of which is shown) are threaded through collar 37 to force brass shoes 39 into engagement with spindle 10 to prevent loosening of the collar during spindle rotation. Abutting the left end of locking disk 32 is a spur gear 40 which is keyed to the spindle for co-joint rotation therewith. A bull gear 42 is keyed to spindle 10 between the left end of spur gear 40 and spindle shoulder 44 and rotates co-jointly with spur gear 40. It is through spur gear 40 and bull gear 42 that rotational energy is transmitted to spindle 10.

Coaxially seated in the bore of spindle 10 and extending therebeyond into frame 14 is a drawbar 46 whose right end is disposed through a sleeve 48 rotatably journaled in the right end of frame 14 by a ball bearing 50 which is carried on the sleeve so as to abut sleeve shoulder 51. A bearing cap 52, having a bore therethrough for receiving sleeve 48, is fastened to right end of frame 10 by screws 53 so as to overlie bearing 50. The rightward end of drawbar 46 is splined to engage complementary splines in the interior bor of a spur gear 56 which is fixedly carried on that portion of drawbar 56 between spindle 10 and sleeve 48. It is through spur gear 56 that rotational energy is transmitted to the drawbar so that the drawbar may be threaded into or out from the shank of a toolholder 57 seated in the bore of spindle 10 to engage and disengage, respectively, the toolholder in the spindle. Spur gear 56 has a slot or channel 58 inscribed circumferentially about its outer periphery for engaging the tines of a shifter fork 62. Shifter fork 62 is attached at its right end to the shaft 63 of a hydraulic cylinder 64 fastened in frame 14 so as to be parallel to drawbar 46. Cylinder 64, when energized in response to a command from the machine tool control numerical system (not shown), urges shifter fork 62 leftwardly to bias pinion gear 56 and the drawrod from a first or rightward-position to a second or leftward-position so that spur gear 56 abuts a stopping collar 66 carried on the drawbar adjacent to collar 37. Note that hydraulic cylinder 64 is only exemplary of the various means available for shifting the spur gear. For example, a lever or bell crank could also be employed to shift the spur gear.

A driving shaft 68 is journaled at its left and right ends into the left and right ends, respectively, of frame 14 by a separate one of ball bearings 70a and 70b, respectively. Ball bearing 70c rotatably journals the medial portion of shaft 68 through wall 28 in frame 14. Shaft 68 is splined for mating engagement with complementary splines projecting inwardly from the interior bore of each of a pair of cluster gears 74a and 74b which are carried on shaft 68 so as to be on the right and left sides of wall 28, respectively. Cluster gear 74b has a pair of gear members 74bb and 74bbb thereon which are each dimensioned to meshingly engage a separate one of spur gear 40 and bull gear 42, respectively, when cluster gear 74b is shifted rightwardly and leftwardly, respectively, from its central most position by conventional means (not shown). Cluster gear 74a has a pair of cluster gear members 74aa and 74aaa thereon. Cluster gear member 74aa is dimensioned complementary to one of the gear members of a cluster gear 76 which is keyed on a shaft 78 whose left end is journaled in wall 28 by a bearing 80a and whose right end is journaled in the right end of frame 14 by bearing 80b so that the shaft is parallel to shaft 68. Gear member 74aaa of cluster gear 74a is dimensioned complementary to both spur gear 56 carried on drawrod 46 and to a pinion gear 82 which is carried on shaft 78 in spaced apart relationship with cluster gear 76. The remaining gear member of cluster gear 76 is dimensioned com-complementary to, for meshing engagement with, a gear 84 carried on a shaft 86 which is journaled at its left end into wall 28 by bearing 88a and is journaled at its rightward end into frame 14 by bearing 88b so as to be parallel to shaft 78.

The right end of shaft 86 extends through frame 14 therebeyond for coupling by a universal coupling 90 to the shaft 92a of a motor 92 which is fastened by bolts 94 (only one of which is shown) to a mounting plate 95 that is fastened by bolts 96 (only one of which is shown) to a projection 97 extending from the righthand end of frame 14.

To prevent gear 56 on drawrod 46 from inadvertently engaging gear member 74aaa of cluster gear 74a, gear 56 and drawrod 46 are urged rightwardly by a spring 98 which is seated in a counter bore in the rearward end of spindle 10 so as to bear against collar 66, which, in turn, bears against gear 56. A nut 99 carried on the drawrod between gear 56 and sleeve 48 limits the rearward displacement of the drawrod caused by the abutment of the spring against the collar.

In operation, rotational coupling between drawbar 46 and shaft 78 is established by shifting cluster gear 74b out of engagement with gears 40 and 42 and by shifting cluster gear 74a rightwardly so that cluster gear member 74aa meshingly engages the first of the gear members on cluster gear 76. Cylinder 64 is then actuated to shift spur gear 56 and drawbar 46 leftwardly so that spur gear 56 meshingly engages cluster gear member 74aaa on cluster gear 74. Once rotational coupling between drawbar 46 and shaft 78 is established, the spindle is locked against rotation by forcing the plunger (not shown) into engagement with keylock disk 32 to prevent the spindle from being driven by the drawrod. Thereafter, spindle drive motor 92 is energized to drive shaft 86, enabling rotational energy to be transmitted from the shaft to shaft 78 for transmission therefrom to shaft 68 and from shaft 68 to the drawrod. In this way, the drawrod can be rotatably threaded into or out from a toolholder disposed in spindle 10 by spindle drive motor 92, the exact same motor which drives the spindle.

To avoid over-driving the drawrod, it is desirable, durintervals when drawrod 46 is being driven by motor 92, to monitor motor 92 torque either directly or indirectly by monitoring motor 92 current to sense when drawbar 46 is fully threaded into or out of toolholder 57. Following engagement of the toolholder in the spindle bore by the drawbar, cylinder 64 is deactuated and each of cluster gears 74a and 74b is then shifted either rightwardly or leftwardly to establish rotational coupling between shaft 86 and spindle 10 so as to permit the spindle to be rotatably driven by spindle drive motor 92. By shifting cluster gear member 74b rightwardly or leftwardly so that one of cluster gear members 74bb and 74bbb meshingly engages spur gear 40 or bull gear 42, respectively, and by shifting cluster gear 74a rightwardly or leftwardly so that one of gear members 74aa and 74aaa meshingly engages a separate one of pinion gear 82 and the first of the gear members of cluster gear 76, spindle 10 can be driven at any one of four separate speeds. Further control of spindle speed may be accomplished by controlling the excitation of spindle drive motor 92.

The foregoing describes a spindle drive train for a machine tool in which the drawbar is rotatably threaded into or out of the shank of a toolholder disposed in the spindle bore by the same motor which rotatably drives the spindle, thus obviating the need for a separate drawbar driver motor.

Although the illustrative embodiment of the invention has been described in considerable detail for the purpose of fully disclosing a practical operative structure incorporating the invention, it is to be understood that the particular apparatus shown and described is intended to be illustrative only and that various novel features of the invention may be incorporated in other structural forms without departing from the spirit and scope of the invention as defined in the subjoined claims.

The principles of this invention having now been fully explained in connection with the foregoing, I hereby claim as my invention:

1. In combination with a machine tool having a rotatably driven, tool receiving spindle, a drawbar coaxially disposed in said spindle for threaded engagement into or out of a toolholder disposed within said spindle so as to engage and disengage, respectively, said toolholder, a source of rotational energy, and a gear train for coupling said source of rotational energy to said spindle, a mechanism for rotatably driving said drawbar into or out of said toolholder from said source of rotational energy comprising:

gear means carried on that portion of said drawbar extending beyond said spindle for engaging said gear train;

means for biasing said gear means out of engagement with said gear train; and shifter means for urging said gear means against said biasing means to bring said gear means into engagement with said gear train so that said drawbar can be rotatably driven through said gear means and said gear train from said source of rotational energy.

2. The invention according to claim 1 wherein said means for biasing said gear means out of engagement with said gear train comprises:

a collar carried on said drawbar so as to be interposed between said gear means and said spindle; and a spring seated in a counter bore in the rearward end of said spindle for urging said collar against said gear means and away from said spindle so as to bias said gear means out of engagement with said gear train.

3. The invention according to claim 1 wherein said shifter means comprises:

a shifter fork for engaging said gear means; and a hydraulically actuated cylinder disposed in said machine tool and having its cylinder shaft fastened to said shifter fork, said cylinder, when pressurized, urging said shifter fork and said gear means against said biasing means to urge said gear means into engagement wih said gear train.

4. In combination with a machine tool having a rotatable tool-carrying spindle, a drawrod coaxially disposed in said spindle for threaded engagement into or out of a toolholder seated in said spindle and a source of rotational energy, apparatus for rotatably driving a separate one of said drawrod and said spindle comprising:

at least one gear keyed on said spindle for imparting rotational energy thereto;

a drive shaft journaled in said machine tool parallel to and spaced apart from said spindle, said drive shaft being driven from said source of rotational energy;

first gear means slidably carried on said drive shaft for engaging said gear carried on said spindle;

second gear means carried on that portion of said drawrod extending beyond said spindle for imparting rotational energy to said drawrod to thread said drawrod into or out of said toolholder seated in said spindle;

third gear means carried on said drive shaft for meshing engagement with said second gear means;

biasing means disposed in said machine tool spindle for yieldably urging said second gear means on said drawbar out of engagement with third gear means carried on said drive shaft;

and shifter means for urging said second gear means against said biasing means and into engagement with said third gear means.

5. The invention according to claim 4 wherein said biasing means comprises:

a collar carried on said drawbar so as to be interposed between said second gear means and said spindle; and a spring seated in a counter bore in the rearward end of said spindle for urging said collar against said gear means and away from said spindle so as to bias said second gear means out of engagement with said first gear means.

6. The invention according to claim 4 wherein said shifter means comprises:

a shifter fork for engaging said second gear means; and a hydraulically actuated cylinder disposed in said machine tool and having its cylinder shaft fastened to said shifter fork, said cylinder when pressurized urging said shifter fork and said second gear means against said spring.

7. The invention according to claim 4 wherein there are two gear keyed on said spindle in spaced apart relationship and wherein said first gear means comprises a cluster gear having a pair of gear members thereon each dimensioned to meshingly engage a separate one of said gears on said spindle.

* * * * *